United States Patent
Held et al.

(10) Patent No.: US 7,536,998 B2
(45) Date of Patent: May 26, 2009

(54) DRIVE UNIT HAVING THERMAL RECOVERY

(75) Inventors: Wolfgang Held, Schnabelwait (DE); Gottfried Raab, Perg (AT)

(73) Assignee: MAN Nutzfahrzeuge AG (DE)

( * ) Notice: Subject to any disclaimer, the term of this patent is extended or adjusted under 35 U.S.C. 154(b) by 84 days.

(21) Appl. No.: 11/681,570

(22) Filed: Mar. 2, 2007

(65) Prior Publication Data

US 2008/0087238 A1    Apr. 17, 2008

(30) Foreign Application Priority Data

Mar. 2, 2006  (DE) .............. 10 2006 010 247

(51) Int. Cl.
*F02M 31/00* (2006.01)
(52) U.S. Cl. .............. 123/542; 123/568.12; 123/562; 123/563
(58) Field of Classification Search ............ 123/568.12, 123/562–563, 540, 542; 60/598, 612
See application file for complete search history.

(56) References Cited

U.S. PATENT DOCUMENTS

| | | | |
|---|---|---|---|
| 3,355,877 A * | 12/1967 | Chaffiotte ................ | 60/599 |
| 5,564,275 A * | 10/1996 | Codan et al. ............. | 60/605.2 |
| 5,791,146 A * | 8/1998 | Dungner .................. | 60/605.2 |
| 6,378,308 B1 * | 4/2002 | Pfluger .................... | 60/612 |
| 6,394,076 B1 * | 5/2002 | Hudelson ................. | 123/540 |
| 6,460,519 B1 * | 10/2002 | Pierpont ............... | 123/568.12 |
| 6,796,134 B1 * | 9/2004 | Bucknell et al. ........... | 62/133 |
| 6,877,317 B2 * | 4/2005 | Kurihara et al. ........... | 60/612 |
| 6,883,314 B2 * | 4/2005 | Callas et al. ............... | 60/599 |
| 6,918,251 B2 * | 7/2005 | Yanagisawa et al. ....... | 60/605.2 |
| 6,973,787 B2 * | 12/2005 | Klingel .................... | 60/612 |
| 7,310,946 B2 * | 12/2007 | Rogg et al. ............... | 60/599 |
| 7,377,270 B2 * | 5/2008 | Duffy et al. .......... | 123/568.12 |
| 2006/0185364 A1 * | 8/2006 | Chalgren et al. ........... | 60/599 |
| 2007/0089501 A1 * | 4/2007 | Endicott .................. | 73/118.1 |
| 2007/0107430 A1 * | 5/2007 | Schmid et al. ............. | 60/612 |
| 2007/0119171 A1 * | 5/2007 | Boyapati et al. ............ | 60/602 |

\* cited by examiner

*Primary Examiner*—Hai H Huynh
(74) *Attorney, Agent, or Firm*—Robert W. Becker; Robert W. Becker & Assoc.

(57) ABSTRACT

A drive unit of a motor vehicle, provided with an internal combustion engine, with a combustion air supply having a low-pressure compressor, a high-pressure compressor and a combustion air cooling unit, and with an exhaust gas withdrawal via which exhaust gas formed in the internal combustion engine is withdrawn. The drive unit has a cooling system with at least one cooling circuit in which are arranged a heat exchanger, through which flows a working medium and which can be cooled by atmospheric air, at least one exhaust gas cooler integrated into the exhaust gas withdrawal, and the combustion air cooling unit has a combustion air intercooler and a main combustion air cooler that are thermally coupled to the cooling circuit in such a way that in the direction of flow of combustion air, the combustion air intercooler is disposed between the low-pressure and the high-pressure compressors, and the main combustion air cooler is disposed downstream of the high-pressure compressor. At least one first cooling circuit and one second cooling circuit are provided that are hydraulically uncoupled via at least one heat exchanger, via which the first and the second cooling circuits are in thermal contact. For a working medium contained in the second cooling circuit an at least partial phase transition can be brought about during an operating phase of the cooling system.

20 Claims, 7 Drawing Sheets

DRIVE UNIT HAVING THERMAL RECOVERY

BACKGROUND OF THE INVENTION

The instant application should be granted the priority date of Mar. 2, 2006, the filing date of the corresponding German patent application 10 2006 010 247.9.

TECHNICAL FIELD

The invention relates to a drive unit of a motor vehicle and is provided with an internal combustion engine, a combustion air supply having a low-pressure compressor, a high-pressure compressor, and a combustion air cooling unit, and with an exhaust gas withdrawal by means of which the exhaust gas formed in the internal combustion engine is withdrawn. Furthermore, a cooling unit is provided that has at least one cooling circuit in which is disposed a heat exchanger, through which flows a working medium and which can be cooled by atmospheric air at least one exhaust gas cooler integrated into the exhaust gas withdrawal, and the combustion air cooling unit. The combustion air cooling unit has a combustion air intercooler and a main combustion air cooler that are thermally coupled to the at least one cooling circuit in such a way that in the direction of flow of the combustion air, the combustion air intercooler is disposed between the low-pressure compressor and the high-pressure compressor, and the main combustion air cooler is disposed downstream of the high-pressure compressor.

STATE OF THE ART

With the combustion of the air/fuel mixture in an internal combustion engine, in addition to the conversion into mechanical energy, also a considerable portion of thermal energy is released. Due to the limited heat resistance of the engine as well as of the attached engine components, it is absolutely necessary to install a cooling unit. The cooling of the engine is possible on the one hand with the aid of an air cooling and on the other hand with a water cooling.

In the vehicle technology industry, water cooling is widely established. With the water cooling, the cylinder head and the cylinder crankcase generally have a double-walled construction, whereby the water jacket is disposed between this wall arrangement, via which the heat of combustion of the engine engine is withdrawn. The coolant circuit is generally composed of a water pump, thermostat, connecting hoses, coolers, expansion reservoirs and fans. A mixture of water and 30-50% antifreeze and corrosion protection agent, generally ethylene glycol, is used as the coolant. In addition to the withdrawal of heat the coolant fulfills the objective of protecting against corrosion, raising the boiling point and preventing freezing of the coolant circuit. With the use of the aforementioned cooling systems, a transfer of heat on the one hand takes places at the wall of the engine, where the engine heat is transferred to the coolant, and on the other hand the heat of the coolant that is to be withdrawn is transferred to the atmospheric air with the aid of a heat exchanger, the so-called cooler, about which atmospheric air flows.

In addition to the previously described guidance of coolant in the cooling circuits of the known liquid-cooled internal combustion engines, furthermore known from DE 10 2004 018 227 A1 is a cooling system for vehicles having a retarder that includes two cooling circuits. The to engine is cooled by the first cooling circuit and the retarder is cooled by the second, parallel cooling circuit, and the heat is subsequently surrendered to the atmosphere in a commonly used radiator/cooler.

DE 197 45 758 A1 furthermore describes a vaporization cooling for internal combustion engines, according to which the water that is used passes through a phase transition liquid-vapor-liquid during the operation of the cooling system. Here the effect is utilized that the heat transfer coefficients not only from the warm wall to the boiling liquid, but also from the vapor to the cold wall during condensation, are higher than with convection of liquid or even air. For this reason, the described technical approach enables the use of smaller heat transfer surfaces and/or operation with lower temperature differences than with convection cooling.

In addition to the previously described systems, cooling systems for motor vehicles are known where different working fluids are used within the cooling system. In this connections DE 42 35 883 A1 discloses a cooling system for liquid-cooled internal combustion engines that additionally has a heat storage device that is coupled to the first cooling circuit via a heat exchanger unit. The cooling system with heat storage to device is intended to ensure that the dimensioning of the quantity of coolant and of the air/liquid heat exchanger can be coordinated to requirements of normal operation, yet affords an adequate withdrawal of engine heat upon peak load requirements. The heat storage device contains a heat storage medium that is in heat exchange with the cooling liquid of the cooling circuit. The heat storage medium is selected in such a way that in the upper operating temperature range of the coolant however at most 10K above the maximum permissible operating temperature, it passes through a phase transition. If the operating temperature of the coolant exceeds the vaporization temperature of the storage medium in the heat storage means, a considerable quantity of heat is withdrawn from the coolant by the phase transition that occurs, and thus a further heating of the coolant is prevented until complete termination of the phase transition.

In addition to providing a heat storage devices it is known to provide a second cooling circuit via which, utilizing the phase transition of a working medium, excessive heat can be withdrawn to the first cooling circuit and can be supplied to components of the vehicle that require heat. Such a cooling system is known from Japanese patent JP 09072255 A. The cooling system described in this document is to provided with a second cooling circuit that is separated from the first by a heat exchanger and in which an ammonia/water mixture circulates as a working fluid, In so doing the different boiling points of the water and the ammonia are utilized to withdraw heat from the engine cooling circuit and to make this heat available to other vehicle components. The cooling system described is essentially provided with a generator, in which the ammonia is evaporated from the water/ammonia mixture with a phase separator, in which the liquid phase is separated from the vaporous phase, with a condenser, in which the ammonia is again liquefied, and with a flow control valve having a further, downstream evaporator, and finally with an absorber in which the gaseous ammonia is dissolved in the water accompanied by the release of heat. With the described cooling system, the heat withdrawn from the region of the engine is transferred in the generator to the ammonia/water mixture and is utilized for heating fuel with the aid of the condenser.

Furthermore known from DE 10 246 807 A1 is a cooling system for motor vehicle engines having charge or combustion air cooling, according to which two air-cooled heat exchangers, as well as a combustion air cooler, are provided in a cooling circuit. Described is a cooling system having an aggregate cooling circuit for cooling an internal combustion engine, which includes a main cooling circuit to having a main coolant cooler, and a supplemental cooling circuit for cooling an additional medium, whereby the supplemental cooling circuit branches off from the main cooling circuit at an uncoupling location and is conveyed back to it at a coupling location that is disposed between the main coolant cooler and a coolant conveying pump. In addition to the two aforementioned coolers, a combustion air cooler is provided with which the combustion air that is supplied to the internal combustion engine is cooled. The important thing with this technical approach is that the cooling circuits can be operated at different temperature levels, and the coolant conveying pump is adjustable with regard to the volume stream that can be conveyed, the conveying capacity, and/or the conveying pressure.

Proceeding from the known state of the art, it is an object of the present invention to provide a cooling system for a drive unit of a motor vehicle having an internal combustion engine that enables the efficient withdrawal of heat from the drive unit and at the same time ensures that the heat is made available to other vehicle components that must be heated up prior to or during driving operation. In this connection, it is in particular to be heeded that also at different operating states of the motor vehicle, a heat transfer between the different vehicle components that is as effective as possible is to be enabled without to hereby losing drive power.

SUMMARY OF THE INVENTION

The invention relates to a drive unit of a motor vehicle and is provided with an internal combustion engine, a combustion air supply having a low-pressure compressor, a high pressure compressor, and a combustion air cooling unit, and with an exhaust gas withdrawal by means of which the exhaust gas formed in the internal combustion engine is withdrawn. Furthermore, a cooling unit is provided that has at least one cooling circuit in which is disposed a heat exchanger, through which flows a working medium and which can be cooled by atmospheric air, at least one exhaust gas cooler integrated into the exhaust gas withdrawal, and the combustion air cooling unit. The combustion air cooling unit has a combustion air intercooler and a main combustion air cooler that are thermally coupled to the at least one cooling circuit in such a way that in the direction of flow of the combustion air, the combustion air intercooler is disposed between the low-pressure compressor and the high-pressure compressor, and the main combustion air cooler is disposed downstream of the high-pressure compressor. Pursuant to the present invention, the drive unit is further improved in that at least one first cooling circuit and at least one second cooling circuit are provided that are hydraulically uncoupled by means of at least one heat exchanger via which the first and the second cooling circuits are in thermal contact, and in that for a working medium contained in the second cooling circuit, an at least partial phase transition can be brought about during an operating phase of the cooling system.

With the system described above, it is thus possible to realize the heat recovery at various heat sources provided in the region of the drive unit. The critical concept here is that the heat energies made available from the heat sources provided in the drive unit of the motor vehicle and existing at different temperature levels are effectively utilized by a temperature-adapted connection of these components and appropriate heat exchangers in that as great a quantity of heat energy as possible is used within the drive unit or for appropriate auxiliary units and is not surrendered to the atmosphere without being used. For this purpose, at least one cooling circuit is provided in which a working medium is heated up in such a way that at least a partial phase transmission is brought about for this working medium.

An integral feature of the invention is that not only the heat obtained in the combustion air cooler but also in the exhaust gas unit is again made usable for the drive unit as well as for the aforementioned auxiliary units by means of the connection to the cooling circuit, in which at least periodically a vaporous working medium is contained. Within the exhaust gas unit, a heat recovery can be realized to the exhaust gas return, via which at least partially exhaust gas is mixed with the combustion air, and/or to a location disposed, for example, downstream of the turbo-supercharger. In such a cooling concept, it is to be understood that further heat sources, such as an oil cooler or a retarder, or fuel coolers, can also be tied in.

There is no hydraulic connection between the first cooling circuit and the second cooling circuit, so that although the first and second cooling circuits are thermally coupled, nonetheless the two cooling circuits are not connected to one another by a flow path. The first cooling circuit is preferably an engine cooling circuit in which the heat obtained in the internal combustion engine is at least partially withdrawn. It is also conceivable to make the heat that is to be withdrawn during the combustion air and/or exhaust gas cooling usable via the engine cooling circuit or one or more further cooling circuits. Depending upon the arrangement of the components of the drive unit, it is thus possible to transfer the heat that is to be withdrawn in the aforementioned components into a first cooling circuit or via at least one heat exchanger into a second cooling circuit, or to transfer the corresponding quantity of heat directly into the second cooling circuit, via which the heat is made available for heat sinks. Due to the separation of different cooling circuits into at least one first and at least one second cooling circuit, it is advantageously possible to regulate the volume streams in the individual cooling circuits in a manner adapted to need or temperature or cooling load. The second cooling circuit is operated in such a way that the working medium disposed in this cooling circuit at least periodically accomplishes a phase transition during the operation of the cooling system.

Pursuant to a special further development of the invention, a first operating medium is provided in the first cooling circuit, and a second working medium is provided in the second cooling circuit, whereby the first and the second working medium differ from one another with regard to their chemical and/or physical properties. The second working medium found in the second cooling circuit preferably has a vaporization point or a vaporization temperature that is lower than the vaporization temperature of the first working medium. Furthermore, it is conceivable for the working medium conveyed in the second cooling circuit to be a mixture of at least two working medium substituents, at least one substituent of which has a vaporization temperature that is lower than the vaporization temperature of the working medium conveyed in the first cooling circuit. It is also conceivable that the first and second cooling circuits be operated at different pressure and/or temperature levels.

Pursuant to a very special embodiment of the proposed cooling system, an ammonia/water mixture can be conveyed in the second cooling circuit. This mixture is primarily characterized in that ammonia ($NH_3$) has a vaporization temperature that is far below the vaporization temperature of water at the pressures that generally exist in cooling systems of motor vehicles. At the normal parameters that are generally assumed and that exist in the atmosphere, ammonia evaporates at approximately −33° C. (approximately 240 K) The previously described technical approach ensures that the first cooling circuit can be operated at a temperature level of about 80-85° C. (approximately 360 K), and nonetheless with the working medium found in the second cooling circuit at least partially a phase transition from the liquid into the vaporous or gaseous phase is to be brought about. Such a further development of the invention is especially desirable if the heat transferred from the first cooling circuit to the second cooling circuit is to be made available for different applications. Furthermore, with the vaporization or condensation of the working medium, better heat transfer coefficients are achieved than with pure convection processes, so that the heat transfer surfaces can be smaller than with conventional heat exchangers and/or the heat exchanger can be operated with smaller temperature spreads.

With the inventive cooling system, it is advantageously possible to use the heat found in the second cooling circuit for specific heat sinks found in the second cooling circuit or for specific heat sinks found in the region of the drive unit or with auxiliary units, such as vehicle heaters or air conditioning units. Furthermore, it is conceivable to convert this heat, or the energy preferably stored in the working medium vapor, into mechanical work, for example in the form of rotational energy. In this manner, it is finally even possible to convert this energy into electrical energy.

If the working medium found in the second working circuit is at least partially converted into a vapor phase, it is, for example, possible to supply this vapor to an expansion unit so that the energy contained in the vapor can be converted into appropriate movement energy. Pursuant to a very special embodiment of the invention, it is furthermore possible to use the movement energy made available by the expansion unit to supplement the drive of the internal combustion engine. In this case, a mechanical connection between a drive shaft of the expansion unit and the internal combustion engine is established with the aid of appropriate coupling units, such as, for example, a crankshaft (of a reverse air compressor principle type), a gear drive, or a belt drive. A very special technical approach in this connection even provides a direct connection of the expansion unit with the drive unit. In this case, the expansion unit is provided with a vapor-operated piston, so that by means of appropriate connecting rod joints or push rods, the mechanical energy made available by the expansion machine can be transferred to the drive unit.

Pursuant to a further embodiment, the vapor found in the second cooling circuit before it is conveyed to the expansion unit, which can be a reciprocating engine, an expander or a turbine, is separated from the liquid phase of the working medium in a separator unit. If, as previously mentioned, an ammonia/water mixture is used as the working medium in the second cooling circuit, the liquid phase, which contains a large proportion of water, is separated from the vaporous ammonia phase in the separator. After the working medium is expanded in the expansion unit, is preferably conveyed to a condenser, in which it is again liquefied accompanied by the release of heat. If the working medium is a multi-substituent working medium, whereby at least merely one of the substituents is converted into the vaporous stage, following the condensation of the working medium that up to then is vaporous a mixture with the liquid substituents of the working medium takes place. In this way, a liquid working medium is again made available that subsequently is again conveyed to the heat exchanger of the second cooling circuit, which is thermally connected to the first cooling circuit. It is of course also conceivable in this connection to provide further components, such as flow control and/or regulating valves, as well as to dispose further heat exchangers within the second cooling circuit, for example for the withdrawal of the heat that results during the absorption of a material.

Pursuant to a further very special embodiment of the invention, a conveying unit for the working medium can be provided in the second cooling circuit, with this conveying unit being operated as a function of an operating level or performance characteristic recorded in a motor control. It is hereby conceivable, for example, to use a pump or a compressor, the speed of which can be controlled and thus the quantity of vapor made available in a second cooling circuit can be adjusted. Depending upon the operating state and the control parameters, the quantity of vapor that is made available, in particular the volume stream, and/or the pressure existing in the second cooling circuit, can be varied. The control of the pressure existing in the second cooling circuit in particular enables the making available of different quantities of vapor as well as the expansion of the vapor produced to a pressure level that is adapted to need. It is, of course, also possible to adapt the volume stream of the working medium that is conveyed, in particular the volume stream of the vapor, to the operating requirements in the second cooling circuit via the previously described controllable conveying unit.

As an alternative to the previously described use in the second cooling circuit of a working medium comprised of at least two substituents, it is conceivable to use a hydrocarbon compound having a low boiling or vaporization temperature as the working medium. Particularly suitable in this connection are butane or pentane compounds. A further medium particularly suitable for use as a working medium in the second cooling circuit is n-perfluoropentane ($C_5F_{12}$). The last-mentioned working medium is characterized primarily in that it represents a non-combustible so-called safety working medium. A listing of possible working media, with their physical or chemical properties that are important for the inventions can be seen in the following table:

| Medium | MoleMass | Critical Point | | Boiling temperature ($10^5$ Pa) | Heat of Vaporization ($10^5$ Pa) | Slope of the Saturated Vapor Curve | Decomposition at Approximately |
|---|---|---|---|---|---|---|---|
| NH3 | 17 | 405.3 K | 11.33 MPa | 239.7 K | 1347 kJ/kg | Negative | 750 K |
| Water | 18 | 647.0 K | 22.06 MPa | 373.0 K | 2256 kJ/kg | Negative | — |
| n-Butane C4H10 | 58.1 | 425.2 K | 3.80 MPa | 272.6 K | 383.8 kJ/kg | — | — |
| n-Pentane C5H12 | 72.2 | 469.8 K | 3.80 MPa | 309.2 K | 357.2 kJ/kg | — | — |
| C6H6 | 78.14 | 562.2 K | 4.90 MPa | 353.0 K | 438.7 kJ/kg | Positive | 600 K |
| C7H8 | 92.1 | 591.8 K | 4.10 MPa | 383.6 K | 362.5 kJ/kg | Positive | — |
| R134a (HFC-134a) | 102 | 374.2 K | 4.06 MPa | 248.0 K | 215.5 kJ/kg | Isentropic | 450 K |
| C8H10 | 106.1 | 616.2 K | 3.50 MPa | 411.0 K | 339.9 kJ/kg | Positive | — |
| R12 | 121 | 385.0 K | 4.13 MPa | 243.2 K | 166.1 kJ/kg | Isentropic | 450 K |

-continued

| Medium | MoleMass | Critical Point | | Boiling temperature ($10^5$ Pa) | Heat of Vaporization ($10^5$ Pa) | Slope of the Saturated Vapor Curve | Decomposition at Approximately |
|---|---|---|---|---|---|---|---|
| HFC-245fa | 134.1 | 430.7 K | 3.64 MPa | 288.4 K | 208.5 kJ/kg | — | — |
| HFC-245ca | 134.1 | 451.6 | 3.86 MPa | 298.2 K | 217.8 kJ/kg | — | — |
| R11 (CFC-11) | 137 | 471.0 K | 4.41 MPa | 296.2 K | 178.8 kJ/kg | Isentropic | 420 K |
| HFE-245fa | 150 | 444.0 K | 3.73 MPa | — | — | — | — |
| HFC-236fa | 152 | 403.8 | 3.18 MPa | 272.0 K | 168.8 kJ/kg | — | — |
| R123 | 152.9 | 456.9 | 3.70 MPa | 301.0 K | 171.5 kJ/kg | Positive | — |
| CFC-114 | 170.9 | 418.9 K | 3.26 MPa | 276.7 K | 136.2 kJ/kg | — | — |
| R113 | 187 | 487.3 K | 3.41 MPa | 320.4 K | 143.9 kJ/kg | Positive | 450 K |
| n-perfluoro-pentane C5F12 | 288 | 420.6 K | 2.05 MPa | 302.4 K | 87.8 kJ/kg | — | — |

The invention furthermore relates to a method of cooling a drive unit of a motor vehicle, wherein an internal combustion engine provided with an exhaust gas withdrawal and a combustion air that is supplied to the internal combustion engine and is at least partially compressed, are cooled by transferring the heat that is to be withdrawn to at least one working medium that is conveyed to a heat exchanger and is cooled in the heat exchanger by atmospheric air, wherein combustion air drawn in from the atmosphere is compressed in a first and a second stage and is cooled after the first and the second compression, wherein exhaust gas found in the exhaust gas withdrawal is at least partially cooled, and wherein the heat withdrawn from the combustion air and the exhaust gas is transferred to the at least one working medium conveyed in a cooling circuit (1), that is further developed in such a way that a first working medium is conveyed in a first cooling circuit and a second working medium is conveyed in a second cooling circuit, and that the second working medium contained in the second cooling circuit is converted at least partially into a vaporous or gaseous phase.

Also the inventively realized method ensures that the heat made available in the region of a motor vehicle drive unit by various heat sources, such as combustion air coolers or exhaust gas return, are made available for further applications without this heat being discharged exclusively to the atmosphere.

With the inventive method, in a preferable manner, a first working medium is circulated in at least one first cooling circuit and a second working medium is circulated in a second cooling circuit, and the heat, which is withdrawn from the combustion air and/or the exhaust gas, preferably via the heat exchanger of the exhaust gas return, is transferred to the working medium conveyed in the first circuit, or heat that is stored in the first working medium is transferred at least partially to the second working medium conveyed in the second cooler circuit. The two cooler circuits are operated separately from one another, which means that in both cooling circuits at least one respective conveying unit is provided. In this way, it is possible with the aid of an appropriate control, to ensure that the first and the second cooling circuits are adapted to the requirements, in other words in particular can be operated as a function of the heat quantities that are to be withdrawn. It is hereby in particular conceivable to convey the working medium found in the second cooling circuit as a function of the operating point of the drive unit (for example cold start phase or full throttle travel).

To realize the inventive method, a working medium is used in the second cooling circuit that at least partially can be converted into a vaporous or gaseous phase due to the transfer of heat directly from the combustion air cooling and/or the exhaust gas cooling into the second cooling circuit, or indirectly by heat transfer out of the first cooling circuit into the second cooling circuit. As soon as vapor is produced in the second cooling circuit, due to a control of the speed of the conveying unit there is ensured that the required quantity of vapor is conveyed in the second cooling circuit. It is also conceivable to set a specific pressure level in the second cooling circuit via the controllable working medium conveying unit. Pursuant to a special embodiment of the invention, the speed-controlled conveying unit is combined with the expansion unit.

Thus, as a function of the heat or energy requirement, in the second cooling circuits evaporation, expansion, liquification, and renewed evaporation of the working medium alternate. Due to the expansion of the vapor in the expansion unit, which can be a turbine or an appropriately designed expansion unit, the thermal energy contained in the vapor is converted into movement energy, preferably rotational energy. This movement energy can, for example, be transferred to the internal combustion engine quasi as a drive supplement to increase the overall system efficiency. By providing a generator, it is furthermore preferably possible to convert the rotational energy into electrical energy that is made available to the motor vehicle or to devices of the motor vehicle that use electricity. It is also conceivable to use the rotational energy made available by the expansion unit quasi as drive energy for other systems.

BRIEF DESCRIPTION OF THE DRAWINGS

Without limiting the general inventive concept, the invention will be described in greater detail subsequently with the aid of embodiments with reference to the drawings, in which.

DESCRIPTION OF PREFERRED EMBODIMENTS

Figure 1:
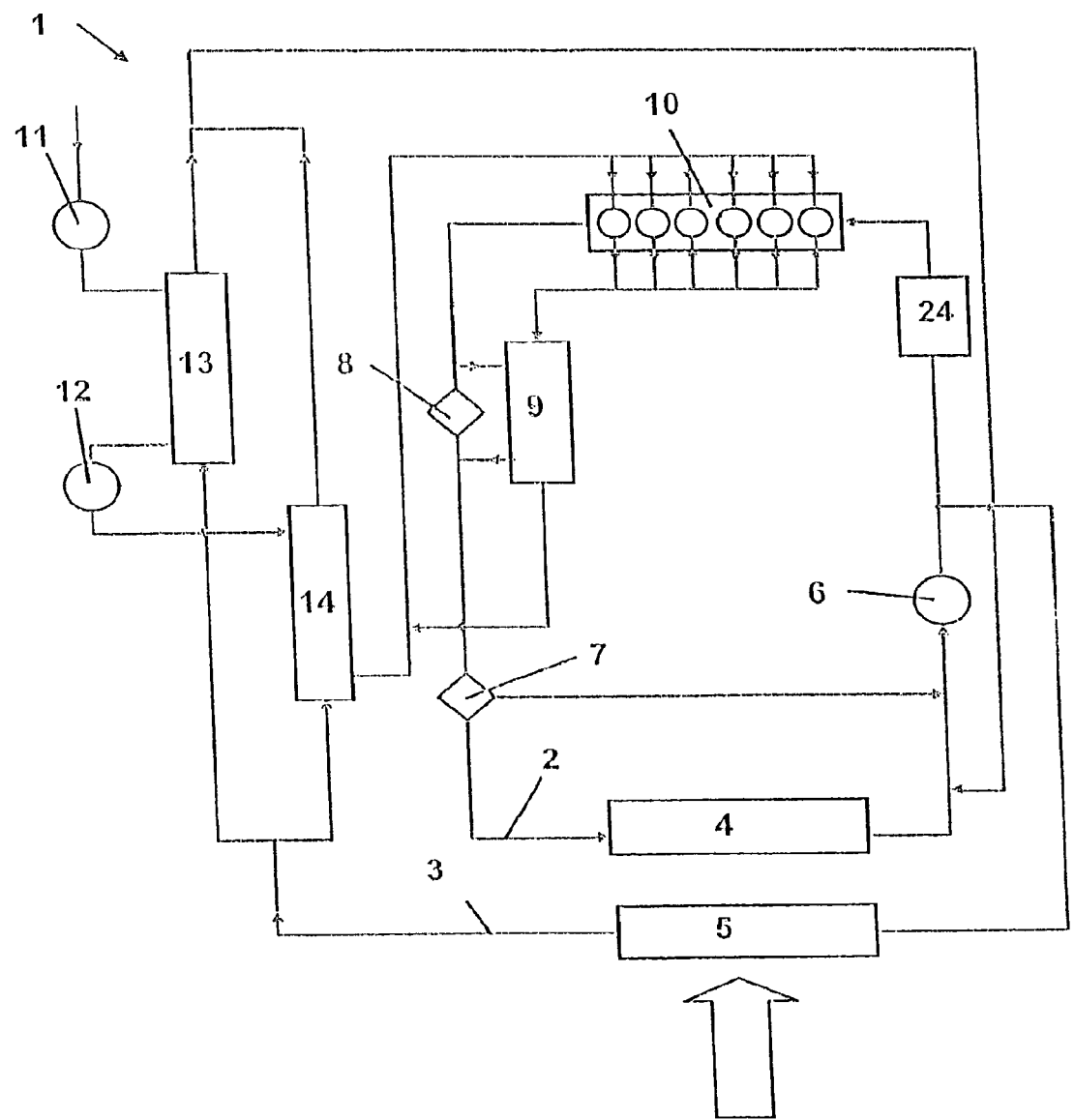
FIG. 1: Shows a cooling system including a high temperature cooling circuit and a low temperature cooling circuit.

Illustrated in FIG. 1 is a cooling system for a drive unit of a motor vehicle; the cooling system represents the basis for the cooling systems that are described in conjunction with FIGS. 2 to 7 and in which a vaporous working medium is at least partially conveyed. To ensure a clearer illustration, the most important components will first be described in detail. The cooling system or circuit 1 illustrated in FIG. 1 is essentially divided into two hydraulically connected main flow paths. The flow paths essentially differ from one another by the temperature level at which they are operated. Thus, involved are a high temperature flow path 2 and a low temperature flow path 3, in which a working medium is circulated at a respectively different temperature. Not only in the high temperature flow path 2, but also in the low temperature flow path 3, respective air/liquid heat exchangers 4,5 are provided that are cooled with the aid of atmospheric air. A working medium that has two substituents is conveyed through the two flow paths, in other words the high temperature flow path 2 and the low temperature flow path 3, via the coolant feed pump 6. The working medium is a mixture of water and a glycol, whereby the glycol raises the vaporization temperature of the mixture relative to pure water, prevents corrosion from occurring within the cooling circuit 1, and furthermore prevents the cooling circuit from freezing at low external temperatures and when the vehicle is not running.

As soon as the coolant feed pump 6 is switched on, it conveys a constant quantity of the cooling or working medium through the coolant circuit 1 as a function of the engine speed. Control valves 7, 8 are provided within the cooling circuit by means of which the flow volume of the working medium through the various flow paths of the coolant circuit 1 can be controlled. In this manner, the flow volume of the working medium that flows through the high temperature cooler 4, the low temperature cooler 5, as well as the exhaust gas cooler 9, which here is a cooler of the exhaust gas return, can be controlled.

With the drive unit illustrated in FIG. 1, the charge or combustion air required for the combustion in the internal combustion engine 10 is drawn in from the atmosphere and is raised via a low-pressure compressor 11 and a high-pressure compressor 12 from atmospheric pressure, in other words approximately $10^5$ Pa(=1 bar), to approximately $3 \cdot 10^5$ pascal (approximately 3 bar). The compression of the combustion air is carried out in two stages in order to maximize the effectiveness of the combustion air compression by cooling the combustion air in a combustion air intercooler 13 that is disposed between the low-pressure compressor 11 and the high-pressure compressor 12. The combustion air that leaves the high-pressure compressor 12 is at a pressure of approximately $3 \cdot 10^5$ Pa and a temperature of approximately 170° C. (approximately 443 K). With the aid of the main combustion air cooler 14, the combustion air is cooled to a temperature of approximately 45° C. (approximately 318 K). Respective liquid/air heat exchangers are provided as the combustion air intercooler 13 and the main combustion air cooler 14; in these heat exchangers, the heat withdrawn from the compressed combustion air is transferred to the working medium that is found in the low temperature circuit 3. After the combustion air leaves the main combustion air cooler 14, a portion of the exhaust gas, which has already left the internal combustion engine 10, is mixed with the combustion air and this exhaust gas/combustion air mixture is supplied to the combustion chamber of the internal combustion engine 10. The portion of the exhaust gas mixed with the combustion air can be 20 to 40% of the exhaust gas that leaves the internal combustion engine.

An exhaust gas cooler 9 is furthermore disposed downstream of the internal combustion engine 10 in an exhaust gas return; the portion of the exhaust gas that is mixed with the combustion air is cooled by the exhaust gas cooler. The heat obtained in the exhaust gas cooler 9 is transferred via an appropriate heat exchanger unit to the working medium conveyed in the high temperature circuit 2. In this connection, the exhaust gas cooler 9 is arranged in such a way that the working medium that leaves the exhaust gas cooler 9, i.e. the heat exchanger unit in the exhaust gas cooler 9, flows to the air-cooled, high temperature cooler 4. The flow volume of the working medium that flows through the exhaust gas cooler 9, i.e. the heat exchanger unit thereof, is regulated by the control valve 8, and the flow volume of the working medium that flows through the high temperature cooler 4 is regulated by the control valve 7. Furthermore, the flow volume of the working medium that flows through the low temperature cooler 5 as well as the parallel-connected combustion air intercooler 13 and the main combustion air cooler 14 can be regulated by the control valve 7. Depending upon the design of the overall system, it is also conceivable for the combustion air intercooler 13 and the main combustion air cooler 14 to be connected in series. Such embodiments will be explained in greater detail in conjunction with the cooling concepts that provide at least one cooling circuit in which a working medium at least partially accomplishes a phase transition In addition to the previously described coolers or heat exchanger units, depending upon the design an oil cooler 24 can furthermore be provided either in the high temperature circuit 2 or in the low temperature circuit 3; by means of the oil cooler, the heat that is withdrawn from the lubricating oil required for the internal combustion engine is transferred into the high temperature circuit 2 or the low temperature circuit 3. Alternatively, or in addition to the previously described lubricating oil cooler, such a cooler can also be an oil cooler of the fuel cooler required and to be cooled oil for other units of a motor vehicle, for example a retarder.

The cooling system described in FIG. 1 is to be operated in such a way that the working medium conveyed in the low temperature circuit has a temperature that is 10-15 K below the vaporization temperature of this working medium. Furthermore, a control of the working medium volume flow is effected with respect to the cooling capacity that is to be made available by the overall cooling system, and/or with respect to a combustion air temperature that is optimum for the combustion process within the internal combustion engine. To enable such an optimum control of the overall control system, appropriate characteristic parameters and performance characteristics are recorded in the engine control. In this way, a cooling of the combustion air cooler and the exhaust gas cooler is made possible taking into account an optimum working point on a characteristic curve and/or optimum emission values of the internal combustion engine.

Figure 2:
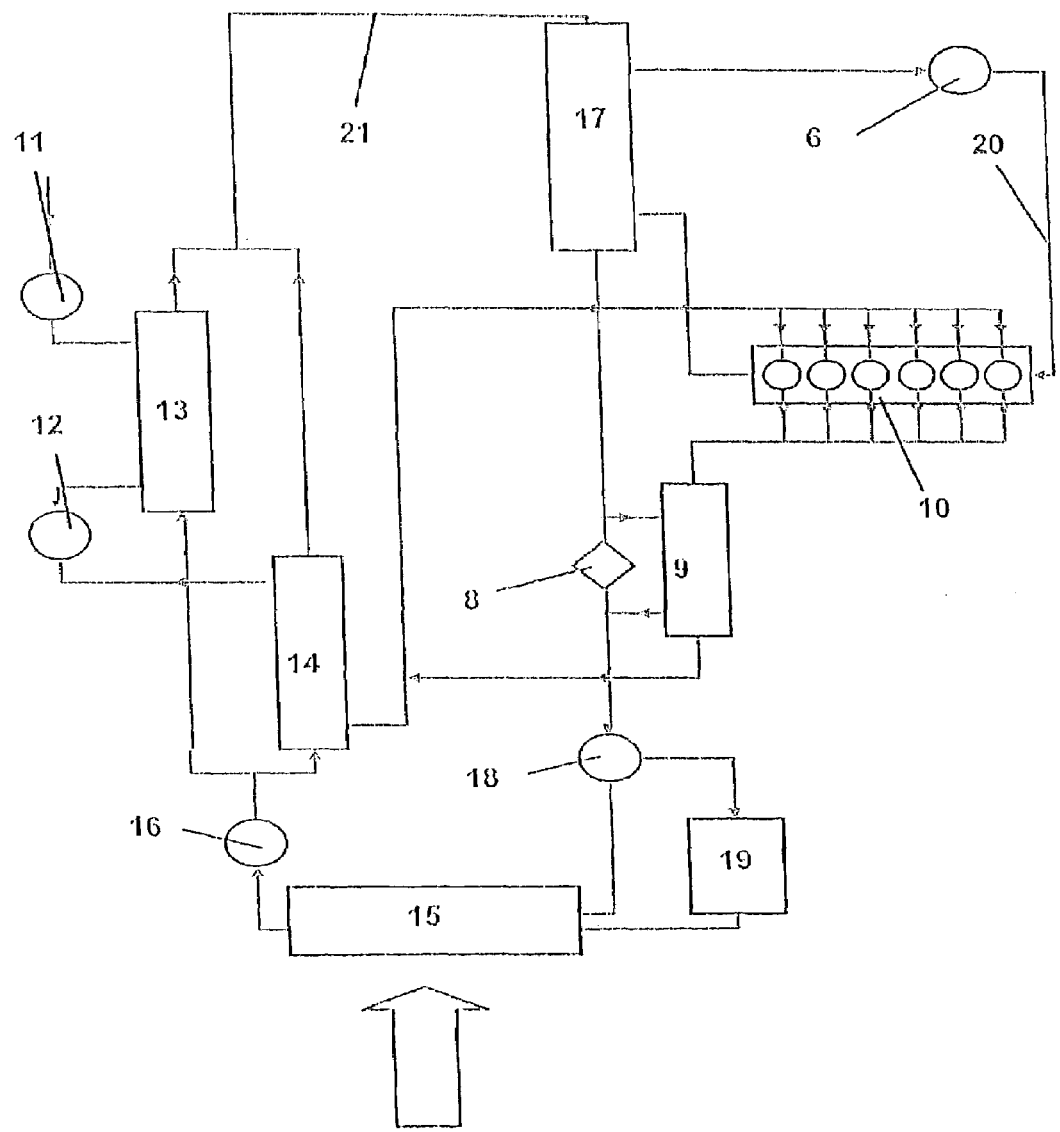
FIG. 2: Shows the cooling concept with vapor production and separate engine cooling circuit.

FIG. 2 illustrates a cooling system in which a cooling circuit is provided in which the working medium at least partially accomplishes a phase transition during the operation. Thus, the cleaning system of FIG. 2 differs from that of FIG. 1 essentially in that the two flow paths, which are at different temperature levels and have a respective low temperature cooler 5 and high temperature cooler 4 that are connected in parallel, have been replaced by respective hydraulically uncoupled cooling circuits. The first cooling circuit 20 is the cooling circuit of the internal combustion engine (engine cooling circuit). In this first cooling circuit 20, the water/glycol mixture is used as the working medium that at least partially transfers heat that is to be withdrawn from the internal combustion engine to the second cooling circuit 21 via the preheater 17. In the second cooling circuit 21, a special working medium is conveyed that at least partially has a lower vaporization temperature than water or the water/glycol mixture conveyed in the first cooling circuit 20.

Making available a compressed and cooled combustion air, to which are mixed portions of the exhaust gas withdrawn from the internal combustion engine, is effected analogously to the cooling system described in conjunction with FIG. 1. Thus, also in FIG. 2 a low-pressure compressor 11 and a high-pressure compressor 12, a combustion air intercooler 13 and a main combustion air cooler 14, as well as an exhaust gas cooler 9, with which the exhaust gas found in the exhaust gas return is cooled, are provided. Also in this case only a portion of the exhaust gas leaving the internal combustion engine 10 is supplied to the combustion air supply via the exhaust gas cooler 9.

Deviating from the system illustrated in FIG. 1, the pressure of the working medium used, after leaving the air-cooled cooler 15, is raised with the aid of a pump 16 from a pressure of approximately $1.5 \cdot 10^5$ Pa to a pressure of about 11 to $16 \cdot 10^5$ Pa. The pump 16 used in this embodiment is a controllable conveying unit via which a suitable quantity of vapor or a specific pressure can be set in the second cooling circuit 21 as a function of the operating state of the drive unit.

The working medium, which is initially pressurized by the pump 16, is subsequently conveyed through the combustion air coolers 13, 14, which are arranged in parallel, and which in an alternative connection can also be disposed in series, and passes at a temperature of about 70 to 90° C. (approximately 353 K) to a preheater 17 in which the temperature of the working medium is raised to a temperature of about at least 105° C. (approximately 378 K), and at the same time, depending upon the operating state, is already partially vaporized. The heat required for the preheating of the working medium in the preheater 17 is made available from the first cooling circuit 20, which withdraws heat from the internal combustion engine.

After leaving the preheater 17, the working medium passes into the exhaust gas cooler 9, whereby the flow volume can be adjusted by the control valve 8. The working medium flowing through the exhaust gas cooler 9 is at least partially vaporized or even superheated. To heat the working medium to a temperature that enables an at least partial phase transition, on the opposite side of the exhaust gas cooler/heat exchanger the exhaust gas withdrawn from the internal combustion engine 10 is cooled from about 650° C. (approximately 920 K) to a temperature of approximately up to 100° C. (approximately 373 K).

After the working medium is at least partially vaporized in the exhaust gas cooler 9, it is conveyed to a separator 18 in which the liquid and the vaporous phases of the working medium are separated from one another. In this connection, it is immaterial whether the working medium used is a single-material working medium or a mixture of several substituents.

Whereas the liquid portion of the working medium from the separator 18 is conveyed directly into the air-cooled heat exchanger, which assumes the function of a condenser 15, the vaporous phase of the working medium is introduced into an expander 19. In the expander 19, the working medium is expanded, whereby the energy stored in the working medium prior to entry into the expander 19 is at least partially converted into movement energy. Depending upon the structural design of the expander 19, an at least partial liquification of the working medium already occurs within the expander due to the expansion. Following the expansion, the working medium is conveyed out of the expander 19 and into the air-cooled heat exchanger 15, where a mixing of the fluid streams of the working medium coming from the expander 19 and from the separator 18 takes place. In this connection, the air-cooled heat exchanger 15 assumes the function of a condenser in which a complete liquification of the working medium, accompanied by the release or loss of heat, takes place.

In this connection, it is also conceivable to dispose a mixing chamber upstream of the heat exchanger 15 (vehicle cooler) or even to couple the mixing chamber with a heat exchanger, so that heat that might be obtained by the absorption of a material can be drawn off from the second cooling circuit 21. The movement energy made available from the expander 19 can be transferred either to the internal combustion engine or to other units. In this connection, it is also conceivable to convert the energy made available from the expander 19 into electrical energy via a generator.

Figure 3:
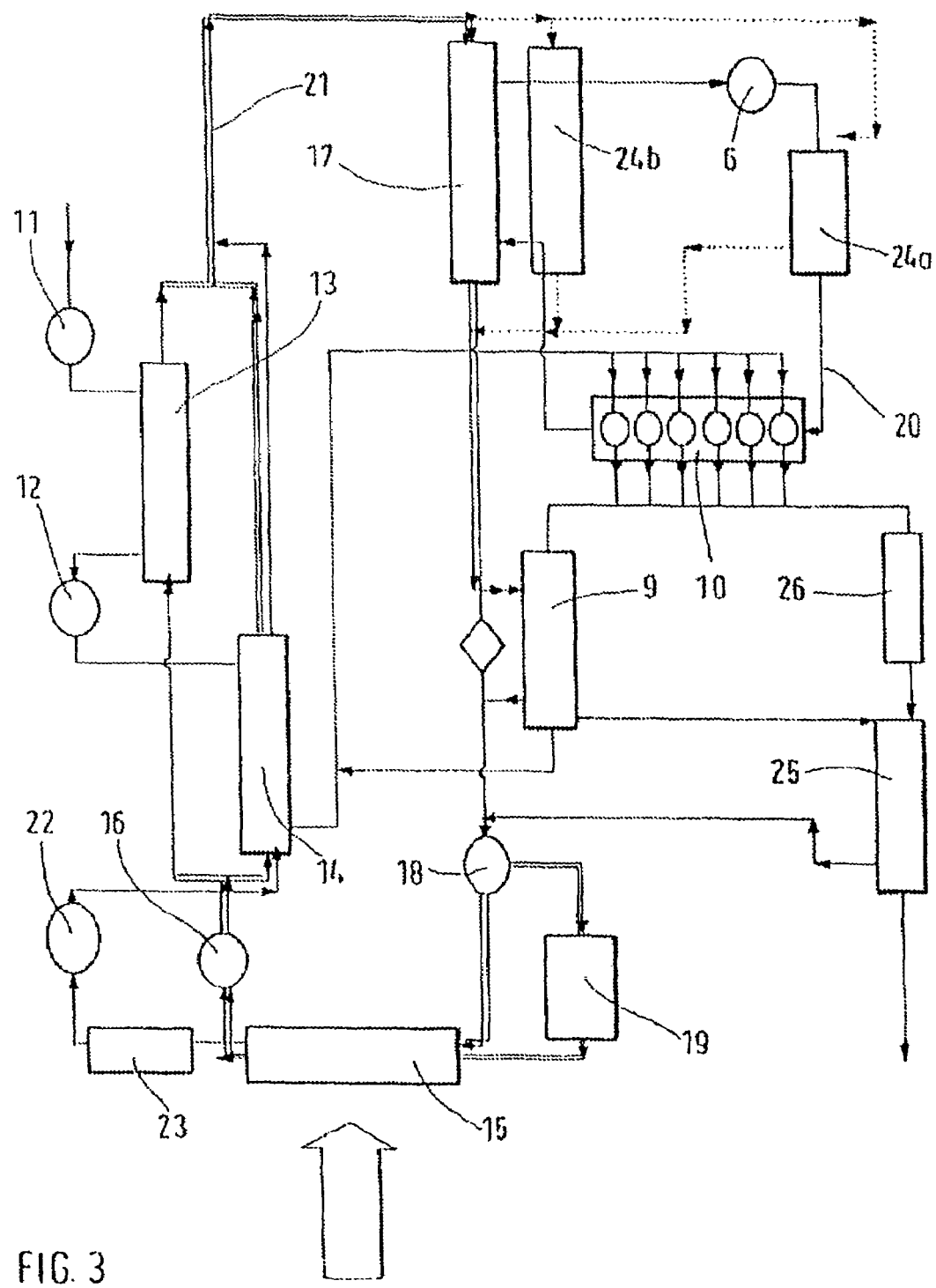
FIG. 3: Shows the cooling concept with vapor production, separate engine cooling circuit and multi-stage working medium condensation.

FIG. 3 illustrates a further cooling system that differs from the systems described in FIGS. 1 and 2 with respect to the utilization of the heat that is made available from various heat sources that are present in the region of the motor vehicle drive unit. The connection of the air supply of the internal combustion engine 10 comprised of the compressor units 11,12 and the combustion air coolers 13, 15, as well as of the cooling of the exhaust gas return, corresponds to the connection described in FIGS. 1 and 2.

Furthermore, in the first cooling circuit 20, in other words the so-called engine cooling circuit, provided in addition to the coolant pump are a transmission lubricant cooler 24*b* and an engine oil cooler 24*a*, the heat of which that is to be withdrawn is transferred to the water/glycol mixture conveyed in the first cooling circuit 20. The heat made available in the first cooling circuit in transferred via the preheater 17 to the second cooling circuit 21 in which, analogous to the embodiment of FIG. 2, an air-cooled heat exchanger 15 is disposed that again assumes the function of a condenser.

In contrast to the working medium found in the first cooling circuit 20, the working medium in the second cooling circuit 21 is heated during the cooling operation in such a way that it accomplishes an at least partial phase transition. As will be explained in greater detail subsequently, the working medium used in the second cooling circuit of FIGS. 2 and 3 can be a single-material working medium having a low vaporization temperature, or a mixture comprised of several substituents, wherein at least one substituent of the mixture has a relatively low vaporization temperature compared to water.

The objective of the connection illustrated in FIG. 3 is to make as great a quantity of vapor as possible available in the second cooling circuit 21 by an optimum utilization of the heat made available from the various heat sources. The energy contained in the quantity of vapor made available is to be converted into movement energy by means of an expander unit. Provided in the second cooling circuit 21 are two working medium conveying units 16, 22, the speed of which, and hence the conveying rate of the working medium and/or the pressure existing in the second cooling circuit 21, can be regulated in a variable manner. The first conveying unit 16 is arranged as in FIG. 2, whereas the additional conveying unit 22 is disposed in a region of the second cooling circuit in which a relatively low temperature exists. In this connection, the control of the conveying units 16, 22 is effective as a function of performance characteristics, which are recorded in the motor control unit, in order as a function of the respective operating state of the drive unit of the motor vehicle to realize and optimum cooling as well as production of vaporization an hence the making available of movement energy.

The description proceeds from the air-cooled heat exchanger 15 (vehicle cooler) in which the working medium, which has already left the separator 18 or the expander 19, is again completely liquefied. There is hereby effected a cooling of the working medium, which is realized in one or two stages.

In principle, there exists a possibility of providing only a single air-cooled heat exchanger 15, which assumes the function of a condenser, and in which the liquefied working medium is cooled from a temperature at about 105° C. to a temperature of about 40° C. In this case, relatively large heat exchangers must be used. From such an air-cooled heat exchanger 15 the working medium is conveyed directly to the combustion air coolers via the conveying pump 16, the speed of which is controlled.

Pursuant to a further connection possibility, a second low temperature condenser 23 can be provided at this location. With this technical approach, the working medium is first cooled in the high temperature condenser 15 to a temperature of about 80° C. A first portion of the thus temperature-treated working medium is conveyed via the pump 16 directly into the combustion air intercooler 13. A second partial stream passes into the low temperature condenser 23, where it is cooled to a temperature of about 40° C. The working medium that is cooled to 40° C. passes via an additional pump 22 to the main combustion air cooler 14. With regard to the connection of the combustion air coolers 13, 14, it is merely mentioned that the main combustion air cooler 14 and the combustion air intercooler 13 can be connected either in parallel or in series.

From the two combustion air coolers 13, 14 the working medium is conveyed to a preheater 17, and is finally vaporized in the exhaust gas cooler 9 or at least partially even superheated. From the exhaust gas cooler 9 the working medium of the second cooling circuit 21 passes into a separator 18 in which the liquid phase of the working medium is separated from the vaporous phase. As with the embodiment described in FIG. 2, the vaporous portion of the working medium is conveyed to an expander unit 19 in which the working medium is expanded. Subsequently, the working medium expanded by the expander 19 again passes into the air-cooled heat exchanger 15 or, pursuant to the described alternative connection, possibly also into the low temperature condenser 23.

In addition to the previously described components, an exhaust gas heat exchanger 25 is also integrated into the second cooling circuit 21. In the direction of flow of the working medium in the second cooling circuit 21, the exhaust gas heat exchanger 25 is disposed downstream of the exhaust gas cooler 9 and primarily extracts from the partial exhaust gas stream, that has directly left the internal combustion engine 10 and has merely additionally flowed through an exhaust gas post treatment system 26, a portion of the heat contained in this partial exhaust gas stream and transfers this heat into the second cooling circuit 21. In the direction of flow of exhaust gas, the exhaust gas post treatment system 26 can also be disposed upstream of the exhaust gas heat exchanger 25. In either case, the exhaust gas heat exchanger 25 is disposed within the second cooling circuit 21 of the embodiment illustrated in FIG. 3, between the exhaust gas cooler 9 and the separator 18

Figure 4:
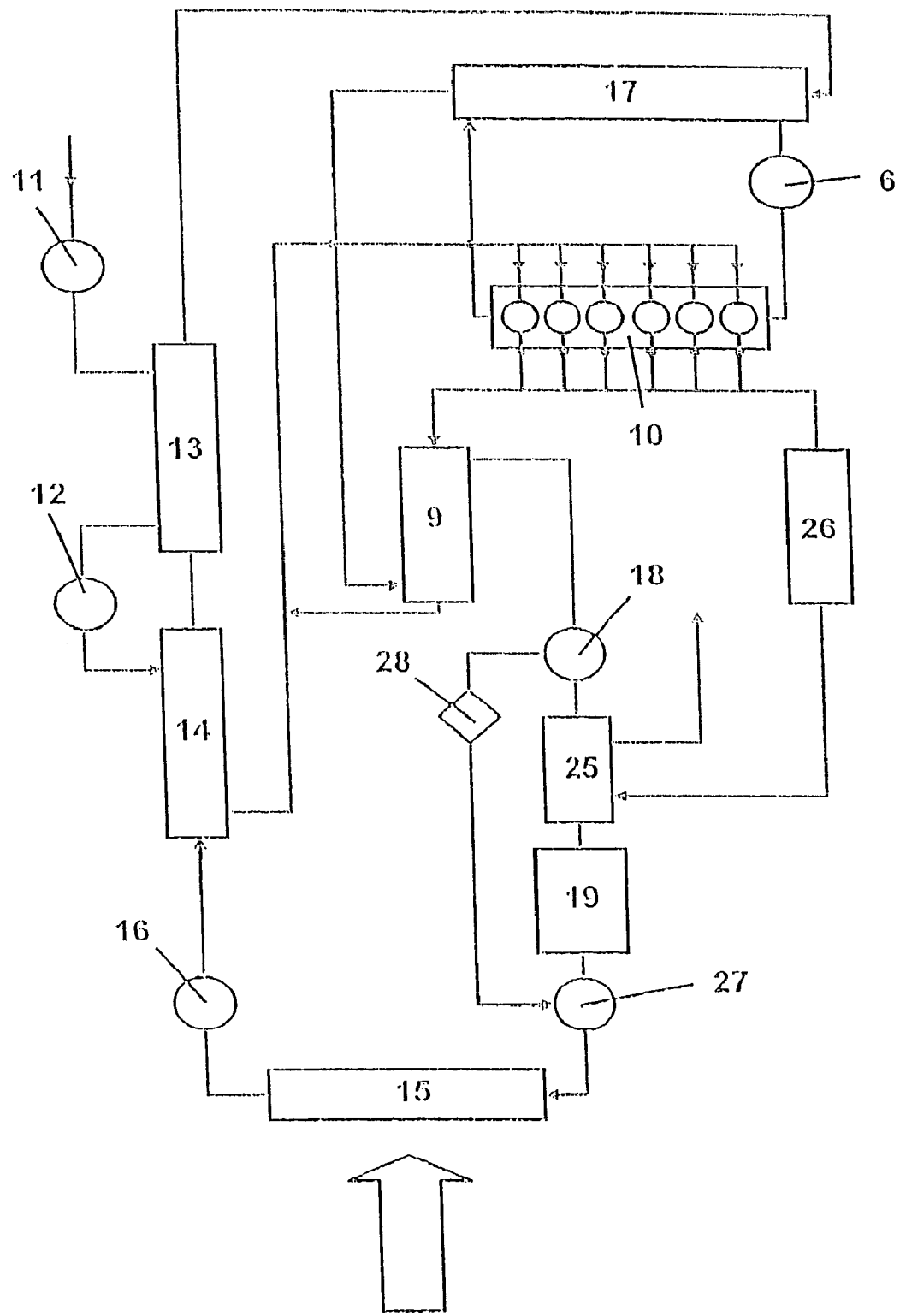
FIG. 4: Shows the cooling concept with vapor production, heat utilization in an exhaust gas post treatment system, and combustion air coolers connected in parallel.

The cooling system illustrated in FIG. 4 differs in two features from the system illustrated in FIG. 3. On the one hand, the combustion air intercooler 13 and the main combustion air cooler 14 are disposed in series; on the other hand, the exhaust gas heat exchanger 25 of this connection is disposed between the separator 18 and the expander 19. Furthermore, provided between the expander 19 and the air-cooled heat exchanger 15, which acts as a condenser, is a mixer 27 in which the liquid phase of the working medium that leaves the separator 18, and the working medium that leaves the expander 19, are mixed. If a multi-substituent working medium is used, absorption processes can also occur in the mixer 27. Furthermore, a flow control valve 28 is provided within the second cooling circuit 21 between the separator 18 and the mixer 27. By means of this flow control valve, an expansion of the working medium that does not flow through the expander 19 is achieved.

Figure 5:
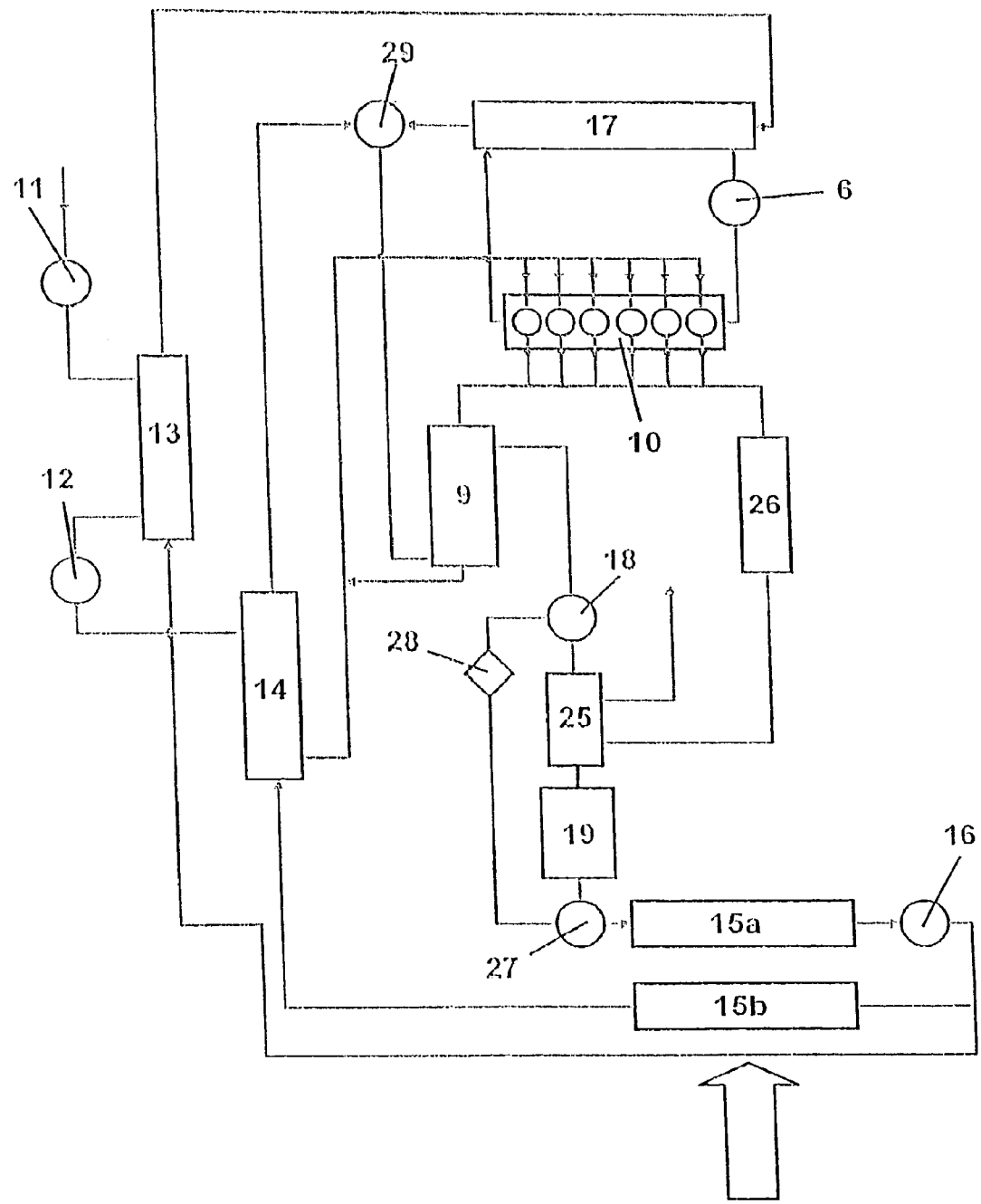
FIG. 5: Shows the cooling concept with vapor production, heat utilization in an exhaust gas post treatment system, and combustion air coolers connected in series.

In FIG. 5, a cooling concept is illustrated with which the air-cooled heat exchanger 15 is formed from a high temperature condenser 15a and a low temperature condenser 15b. The conveying unit 16 is disposed downstream of the high temperature condenser 15a for selectively supplying the liquefied working medium either to the low temperature condenser 15b and the main combustion air cooler 14, or directly to the combustion air intercooler 13. Alternatively, the branching-off to the low temperature condenser 15b can be provided upstream of the conveying unit 16 in order to ensure a low pressure in the low temperature condenser 15b. Furthermore, a further mixer 29 is provided in which the working medium leaving the main combustion air cooler 14, and the working medium leaving the preheater 17, are mixed. In this case, working medium is conveyed to the preheater 17, that has flowed through the combustion air intercooler 13.

Figure 6:
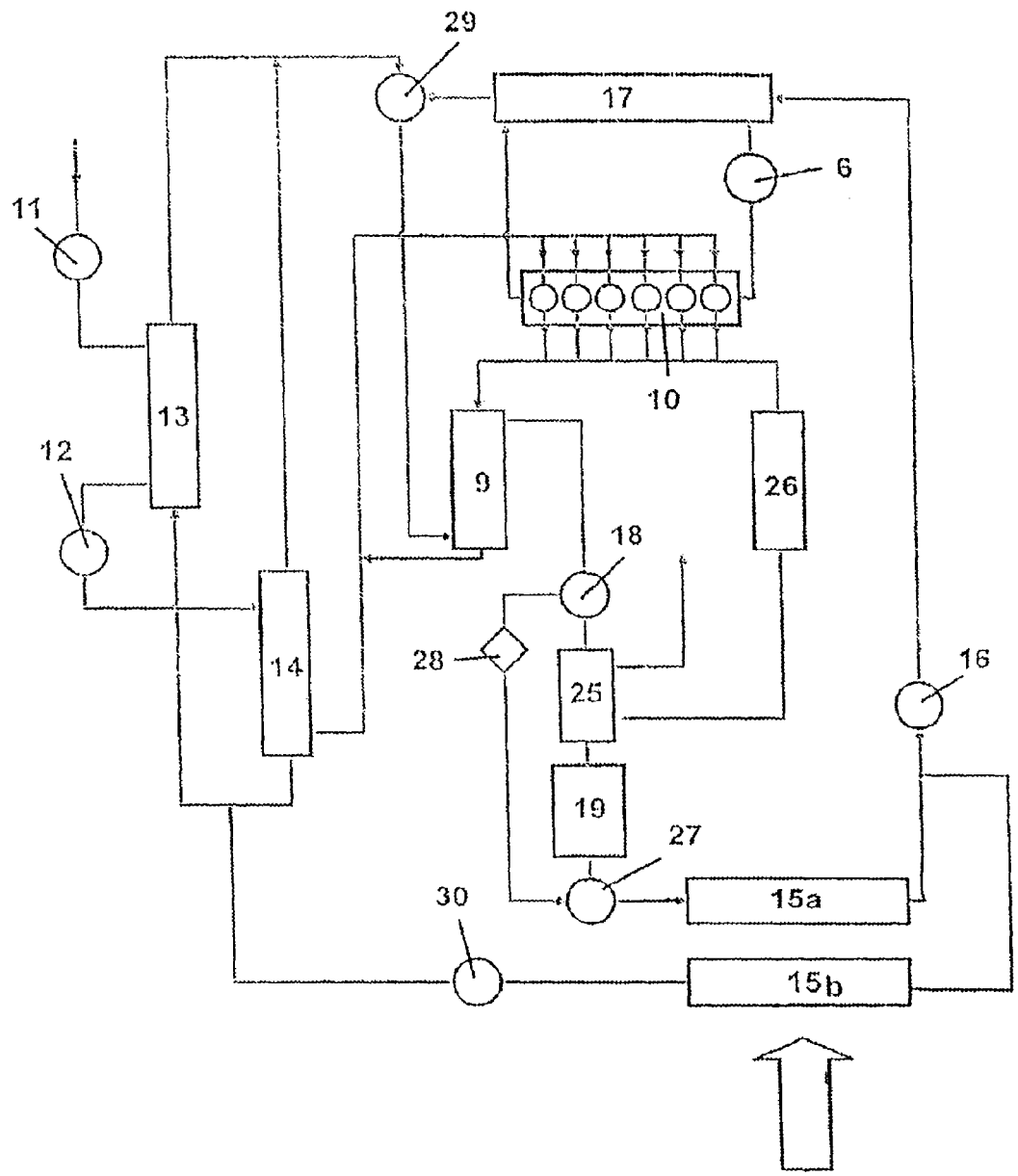
FIG. 6: Shows the cooling concept with vapor production, heat utilization in an exhaust gas post treatment system, two condensers, and combustion air coolers connected in parallel.

A cooling system that is slightly modified from that shown in FIG. 5 is illustrated in FIG. 6. Essential hereby is first that a branching-off to the low temperature condenser 15b is provided upstream of the conveying unit 16, so that a relatively low pressure is ensured in the low temperature condenser 15b. Furthermore, a further conveying unit 30 for increasing the pressure is disposed downstream of the low temperature condenser 15b. This conveying unit 30 can also be controlled in a variable manner. Furthermore, the portion of the working medium that leaves the high temperature condenser 15a and that is not conveyed into the low temperature condenser 15b is conveyed via a conveying unit 16 directly to the preheater 17 without flowing through a combustion air cooler.

Figure 7:
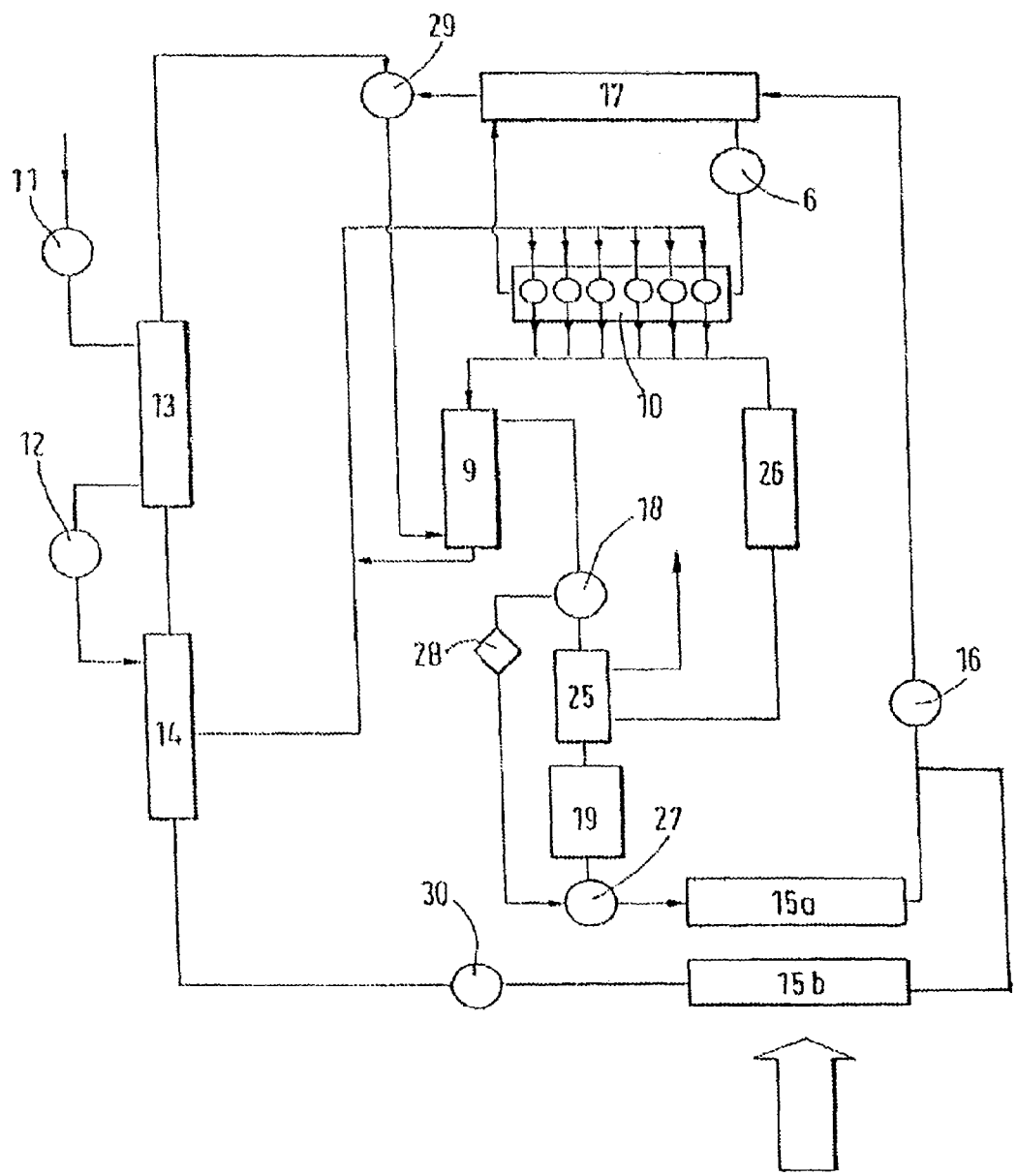
FIG. 7: Shows the cooling concept with vapor production, heat utilization in an exhaust gas post treatment system, two condensers, and combustion air coolers connected in series.

Finally, FIG. 7 illustrates a cooling system that is modified from the cooling system of FIG. 6 in that working medium is supplied to the low temperature condenser 15b through the conveying unit 16, and on the other hand the combustion air coolers 13, 14, in the direction of flow of the working medium, are disposed in series downstream of the low temperature condenser 15b. Here also a parallel connection of the combustion air coolers is possible in principle. A partial stream of the working medium is here also conveyed directly from the high temperature condenser 15a into the preheater 17 via the conveying unit 16. A mixer 29 is again provided downstream of the preheater 17; the working medium that leaves the preheater 17 is mixed with the working medium from the combustion air coolers 13, 14 in the mixer 29.

The cooling systems described in conjunction with FIGS. 1 to 7 are particularly suitable for use in commercial vehicles.

Precisely in these vehicles is the requirement great for technical solutions that offer alternatives to conventional cooling concepts.

The working medium that has a relatively low vaporization temperature relative to water can be not only a mixture but also a single-material working medium. The mixtures are generally aqueous solutions, whereby a coolant having a low boiling point, in other words a low vaporization temperature, is dissolved in water. If such a multi-substituent working medium is heated, the substituents that have a low vaporization temperature evaporate, whereas an aqueous solution containing mostly water remains in the liquid phase. Preferably, ammonia/water mixtures are used as multi-substituent working media where various concentrations of ammonia are dissolved in water. Particularly suitable in this connection appear to be ammonia/water mixtures where the ammonia fraction is 30, 40 or 50 percent of the total mixture.

An alternative to using the aforementioned multi-substituent working media are fluidic materials that have a relative low vaporization temperature. Particularly suitable in this connection are materials that in addition to a low vaporization temperature, also have a relatively high heat capacity. For this reason, primarily suitable are hydrocarbons, in particular pentanes, as well as the fluorohydrocarbons known as refrigerants in air conditioning units (for example R134a, 245fa, 245ca). A detailed listing of the materials that can be used as working media is shown in the table described in the specification.

The specification incorporates by reference the disclosure of German 10 2006 010 247.9 filed Mar. 2$^{nd}$, 2006.

The present invention is, of course, in no way restricted to the specific disclosure of the specification and drawings, but also encompasses any modifications within the scope of the appended claims.

REFERENCE NUMERAL LIST

1. Cooling System
2. High Temperature Flow Path
3. Low Temperature Flow Path
4. High Temperature Cooler
5. Low Temperature Cooler
6. Coolant Pump
7. Control Valve
8. AGR Control Valve
9. Exhaust Gas Cooler
10. Internal Combustion Engine
11. Low Pressure Compressor
12. High Pressure Compressor
13. Combustion Air Intercooler
14. Main Combustion Air Cooler
15. Condenser Embodied as an Air Cooled Heat Exchanger
    15a. High Temperature Condenser
    16a. Low Temperature Condenser
16. Conveying Unit
17. Preheater
18. Separator
19. Expander
20. First Cooling Circuit
21. Second Cooling Circuit
22. Additional Conveying Unit
23. Supplemental Low Temperature Condenser
24. Oil Cooler
    24a. Engine Oil Cooler
    24b. Transmission Lubricant Cooler
25. Exhaust Gas Heat Exchanger
26. Exhaust Gas Post Treatment System
27. Mixer
28. Flow Control Valve
29. Mixer
30. Conveying Unit

The invention claimed is:

1. A drive unit of a motor vehicle, wherein said drive unit is provided with an internal combustion engine (10), with a combustion air supply having a low-pressure compressor (11), a high-pressure compressor (12), and a combustion air cooling unit (13, 14), and with an exhaust gas withdrawal by means of which exhaust gas formed in said internal combustion engine (10) is withdrawn, wherein at least one exhaust gas cooler (9) is integrated into said exhaust gas withdrawal, comprising:

a combustion air cooling unit (13, 14) that is provided with a combustion air intercooler (13) and a main combustion air cooler (14);

a cooling system having at least one first cooling circuit (20) and at least one second cooling circuit (21), wherein said at least one exhaust gas cooler (9) is disposed in said cooling system, and wherein said combustion air cooling unit (13, 14) is disposed in said cooling system and said combustion air intercooler (13) and said main combustion air cooler (14) are thermally coupled to said first and second cooling circuits (20, 21) in such a way that in a direction of flow of combustion air, said combustion air intercooler (13) is disposed between said low-pressure compressor (11) and said high-pressure compressor (12), and said main combustion air cooler (14) is disposed downstream of said high-pressure compressor (12); and at least one heat exchanger disposed in said cooling system and adapted to be cooled by atmospheric air, wherein a working medium is adapted to flow through said heat exchanger, further wherein said first and second cooling circuits (20, 21) are hydraulically uncoupled by means of said at least one heat exchanger, via which said first and second cooling circuits (20, 21) are in thermal contact, and wherein the second cooling circuit (21) is configured for producing useable heat, whereby the working medium contained in the second cooling circuit is heatable during an operating phase of the cooling assembly by heat produced by flowing the working medium through a plurality of heat sources (13, 14, 9, 25), whereby an at least partial phase transition of said working medium into a gaseous or vaporous state is adopted to be brought about, and wherein energy made available in the working medium in such a manner is deliverable to at least one consumer (19) integrated in the second cooling circuit (21) for use by said at least one consumer (19).

2. A drive unit according to claim 1, wherein a first working medium is contained in said at least one first cooling circuit (20), and a second working medium is contained in said at least one second cooling circuit (21), and wherein said first working medium and said second working medium have different physical and/or chemical properties.

3. A drive unit according to claim 2, wherein said second operating, medium contained in said at least one second cooling circuit (21), or at least a substituent of said second working medium, has a lower vaporization temperature than does said first working medium contained in said at least one first cooling circuit (20).

4. A drive unit according to claim 2, wherein said second working medium contained in said at least one second cooling circuit (21) is an ammonia/water mixture.

5. A drive unit according to claim 2, wherein said second working medium contained in said at least one second cooling circuit (21) is a hydrocarbon compound.

6. A drive unit according to claim 2, wherein said second working medium contained in said second cooling circuit (21) is n-perfluoropentane ($C_5F_{12}$).

7. A drive unit according to claim 1, wherein an oil cooler (24) is provided that is thermally coupled to said at least one first cooling circuit (20).

8. A drive unit according to claim 1, wherein said at least one exhaust gas cooler (9) is provided with an exhaust gas return cooling unit that is disposed between said exhaust gas withdrawal and said combustion air supply in such a way that by means of said exhaust gas return cooling unit, heat is adapted to be transferred to said at least one second cooling circuit (21) from a partial exhaust gas stream diverted from said exhaust gas withdrawal prior to introduction into the combustion air supply.

9. A drive unit according to claim 1, wherein a working medium conveying unit (16, 22, 30) is provided in said at least one second cooling circuit (21), and wherein said working medium conveying unit is adapted to be controllable as a function of at least one operating parameter of said cooling system.

10. A drive unit according to claim 1, wherein said at least one first cooling circuit (20) and said at least one second cooling circuit (21) are adapted to be operated at different temperature levels.

11. A drive unit according to claim 1, wherein said at least one second cooling circuit (21) is provided with at least one high temperature circuit and at least one low temperature circuit, further wherein said at least one high temperature circuit is adapted to be operated at a higher temperature level than is said at least one low temperature circuit, further wherein a high temperature heat exchanger (15a), which is adapted to be cooled by atmospheric air, is provided in said at least one high temperature circuit, and wherein a low temperature heat exchanger (15b), which is adapted to be cooled by atmospheric air, is provided in said at least one low temperature circuit.

12. A drive unit according to one of the claim 1, wherein a heat engine (19) is provided in said at least one second cooling circuit (21), and wherein during said operating phase of said cooling system said heat engine (19) is adapted to be supplied with working medium that is at least partially converted into a vapor phase.

13. A drive unit according to claim 12, wherein said heat machine (19) is a turbine unit or an expansion unit.

14. A drive unit according to claim 12, wherein said heat engine (19) is in operative connection with said internal combustion engine (10).

15. A drive unit according to claim 14, wherein said heat machine (19) is in operative connection with said internal combustion engine (10) via a crankshaft, a gear drive, or a belt drive.

16. A method of cooling a drive unit of a motor vehicle, wherein an internal combustion engine (10) provided with an exhaust gas withdrawal, and combustion air that is supplied to said internal combustion engine (10) and is at least partially compressed, are cooled, said method including the steps of:
providing a first cooling circuit,
conveying a first working medium in said first cooling circuit,
providing a second cooling circuit, wherein the second cooling circuit is configured for producing useable heat, whereby a working medium contained in the second cooling circuit is heatable during an operating chase of the cooling assembly by heat produced by flowing-through of a plurality of heat sources,
conveying a second working medium in said second cooling circuit, wherein said second working medium is converted at least partially into a vaporous or gaseous phase, and wherein heat that is to be withdrawn is transferred to at least one of said working media,
conveying said at least one working medium to a heat exchanger,
cooling said at least one working medium in said heat exchanger via atmospheric air,
compressing combustion air drawn in from the atmosphere in a first stage and in a second stage,
cooling said combustion air after a first stage and a second stage compression,
at least partially cooling exhaust gas disposed in said exhaust gas withdrawal, and
transferring heat withdrawn from said combustion air and said exhaust gas to at least one of said working media, wherein energy made available in the at least one of said working media in such a manner is deliverable to at least one consumer integrated in the second cooling circuit for use by said at least one consumer (19).

17. A method according to claim 16, wherein different phases of said working medium are separated from one another.

18. A method according to claim 17, wherein said second working medium is at least partially expanded, and wherein energy contained in said second working medium prior to beginning of expansion is converted at least partially into rotational energy.

19. A method according to claim 18, wherein said rotational energy is at least partially transferred to said internal combustion engine (10).

20. A method according to claim 18, wherein said rotational energy is at least partially converted into electrical energy.

* * * * *